United States Patent

Fujioka et al.

Patent Number: 5,414,481
Date of Patent: May 9, 1995

[54] IMAGE PROJECTOR AND IMAGE FORMING APPARATUS FOR IMAGE PROJECTION

[75] Inventors: Tetsuya Fujioka, Yokohama; Hiroshi Takahashi, Kawasaki, both of Japan

[73] Assignee: Ricoh Company, Ltd., Tokyo, Japan

[21] Appl. No.: 210,296

[22] Filed: Mar. 18, 1994

[30] Foreign Application Priority Data

Mar. 18, 1993 [JP] Japan ................... 5-058639
Mar. 18, 1993 [JP] Japan ................... 5-058640

[51] Int. Cl.⁶ .................................. G03B 21/28
[52] U.S. Cl. ........................... 353/122; 353/DIG. 3
[58] Field of Search .......... 353/122, DIG. 3, DIG. 4; 359/72; 355/230, 232, 233, 235; 358/296, 300, 302

[56] References Cited

U.S. PATENT DOCUMENTS

| | | | |
|---|---|---|---|
| 4,811,110 | 3/1989 | Ohmura et al. | 353/119 |
| 4,839,731 | 6/1989 | Saka | 353/122 |
| 4,851,924 | 7/1989 | Nakamura et al. | 353/122 |
| 5,214,457 | 5/1993 | Takanashi et al. | 353/122 |

FOREIGN PATENT DOCUMENTS 0017615 1/1991 Japan ................... 353/122

Primary Examiner—William A. Cuchlinski, Jr.
Assistant Examiner—William C. Dowling
Attorney, Agent, or Firm—Oblon, Spivak, McClelland, Maier & Neustadt

[57] ABSTRACT

In an image projector and an image forming apparatus for image projection, after a document has been laid on a glass platen, a voltage is applied from a power source to transparent electrodes respectively formed on the upper and lower surfaces of a combined polymer and liquid crystal film. As a scanner scans the document, the resulting reflection from the document scans the film. As a result, an image matching the document in tonality is formed in the film in the form of a transmittance distribution and in the original scale. After the document has been removed from the glass platen, a lamp included in an illumination unit is turned on to project the image held in the film onto a screen in an enlarged scale via mirrors and a lens which are included in a projection unit.

8 Claims, 10 Drawing Sheets

IMAGE PROJECTOR AND IMAGE FORMING APPARATUS FOR IMAGE PROJECTION

BACKGROUND OF THE INVENTION

The present invention relates to an image projector for optically projecting a document image onto a screen and an image forming apparatus for image projection and, more particularly, a plain paper projector (PPP).

It is a common practice with a purely optical overhead projector (OHP) or a slide projector to use a transparent sheet, i.e., an OHP sheet or a slide film, as taught in Japanese Patent Laid-Open Publication No. 4-128734 by way of example. Light transmitted through the transparent sheet and, therefore, an image carried on the sheet is projected onto a screen in an enlarged scale. This kind of projector, however, cannot project opaque plain sheet documents, not to speak of thick book documents. It follows that the images of such documents have to be written on transparent sheets by hand or transferred by a copier.

In light of the above, a projector may be constructed to project light transmitted through an electrically driven TFT (Thin Film Transistor) type liquid crystal display, as proposed in, for example, Japanese Patent Laid-Open Publication No. 4-149417. Such a semioptical and semielectrical projector photoelectrically converts a document image and then electrically writes it in the liquid crystal display. The resulting image written to the display is optically projected onto a screen in an enlarged scale. Since this projector transforms the image to an electric signal beforehand and stores it, it is not necessary for the operator to replace the document. However, a problem with the projector using a TFT type liquid crystal display is that the display, which is electrically driven, increases the size and cost of a scanner for scanning a document and those of a digital image processing device. Another problem is that this type of projector is troublesome to operate. Moreover, since the TFT type display needs TFTs for respective pixels, it cannot be easily increased in size due to limited yield.

SUMMARY OF THE INVENTION

It is, therefore, an object of the present invention to provide an image projector and an image forming apparatus for image projection which make it needless to prepare special documents beforehand and have a small size, inexpensive and easy-to-operate configuration.
an image
In accordance with the present invention, projector for projecting a document laid on a document setting member in an enlarged scale comprises an optically responsive film selectively transmitting or diffusing incident light when illuminated, a focusing device for focusing a reflection from the document onto the film to thereby transfer the image of the document to the film; an illuminating device for illuminating the film, and a projecting device for projecting, in an enlarge scale, light issued from the illuminating means and transmitted through the film.

Also, in accordance with the present invention, an image forming apparatus for image projection comprises an optically responsive film selectively transmitting or diffusing incident light when illuminated, and a focusing device for focusing a reflection from the document onto the film to thereby transfer the image of the document to the film.

Further, in accordance with the present invention, an image projecting method comprises the steps of preparing an optically responsive film which selectively transmits or diffuses incident light, depending on whether or not the film is illuminated, focusing a reflection from the image of a document onto the film to thereby form the image in the film, and illuminating the film to thereby project light transmitted through the film.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the present invention will be described hereinafter.

1st Embodiment

Figure 1:
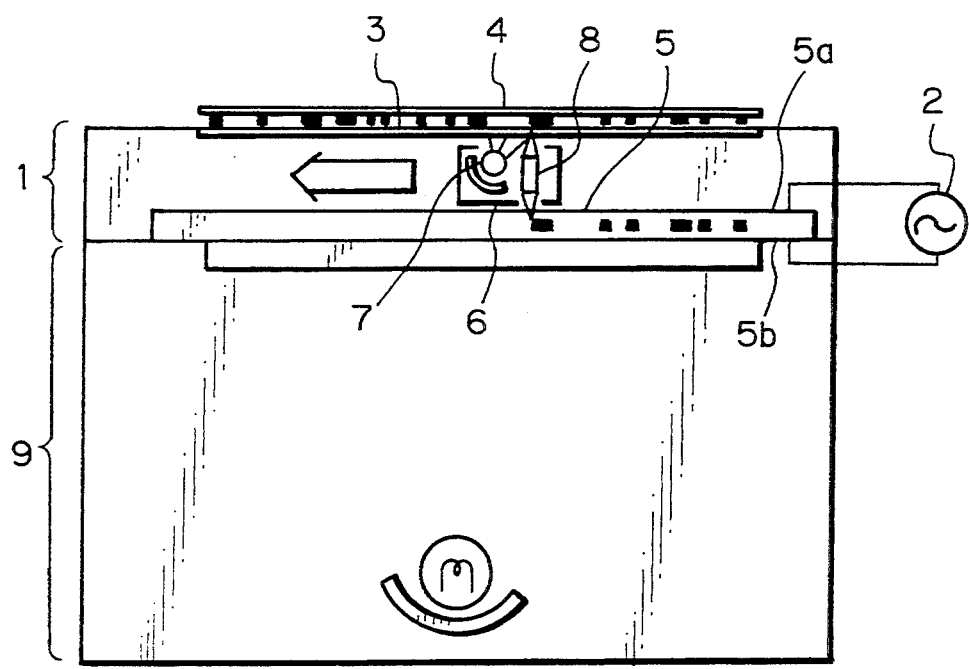
FIG. 1 is a sectional side elevation showing a first embodiment of the image projector in accordance with the present invention in a document reading condition.
Figure 2:
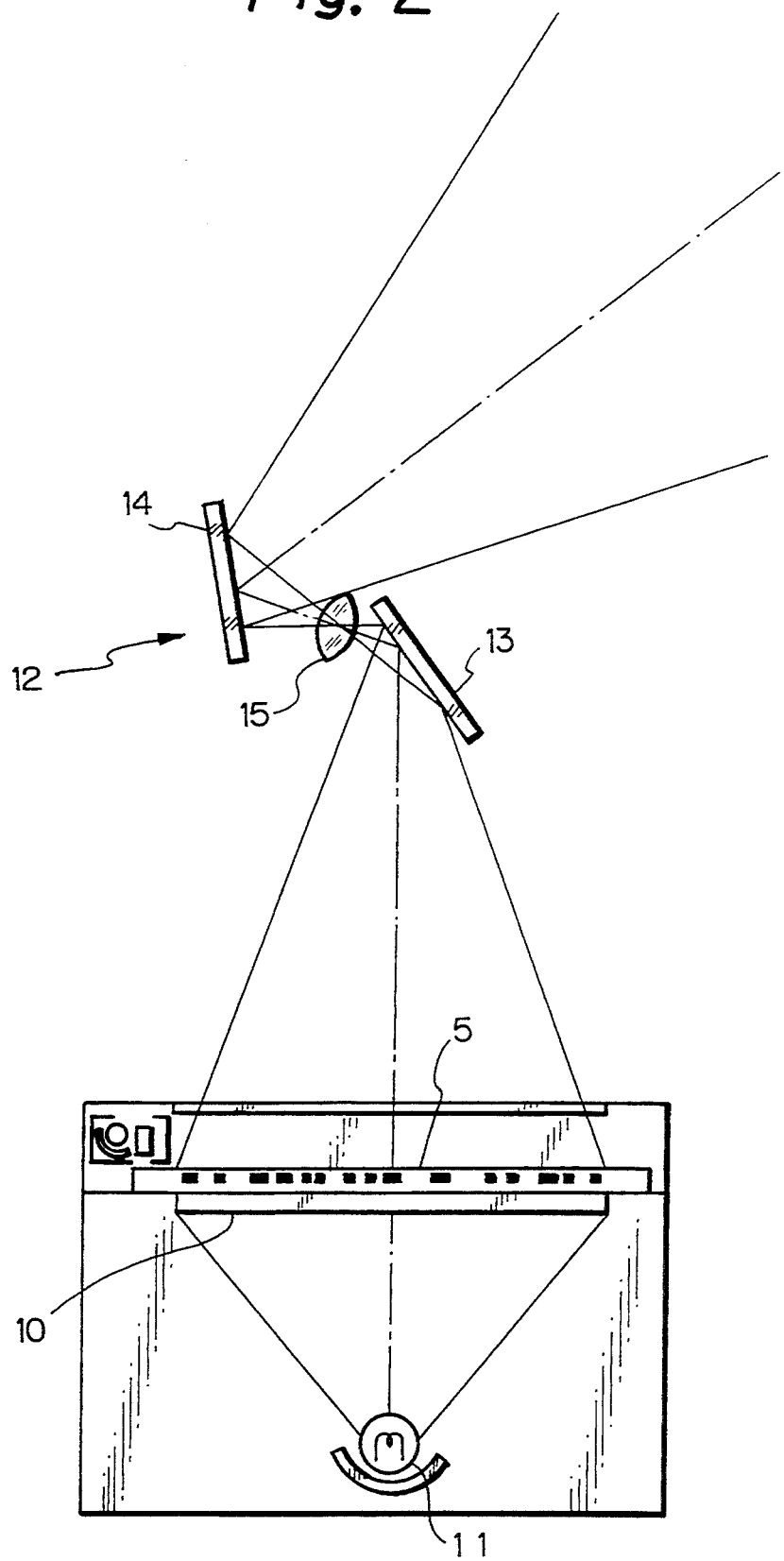
FIG. 2 is a view similar to FIG. 1, showing the image projector in an image projecting condition.

Referring to FIGS. 1 and 2 of the drawings, an image projector embodying the present invention is shown and constructed to read a document image in the original scale of the document and project it by transmission. As shown, the device is generating made up of a scanner unit 1, an illumination unit 9, and a projection unit 12. The scanner unit 1 optically scans a plain paper document 4 and transfers it to a combined polymer and liquid crystal film 5, which is a specific form of an optically responsive liquid crystal film. The illumination unit 9 illuminates the image transferred to the film 5 at a time. The projection unit 12 projects light transmitted through the film 5. When light from the illumination unit 9 is incident to the film 5, the film 5 selectively transmits it or diffuses it, as will be described specifically later.

The scanner unit 1 is removably mounted on the illumination unit 9. The scanner unit 1 has, in addition to the combined polymer and liquid crystal film 5, transparent electrodes 5a and 5b respectively formed on the upper and lower surfaces of the film 5, a power source 2 for applying a voltage to the electrodes 5a and 5b, a transparent glass platen 3 on which a document 4 is laid face down, and a scanner 6 for optically scanning the document 4 and transferring it to the film 5. The scanner 6 includes a lamp 7 for illuminating the document 4 via the glass platen 3 in the main scanning direction (perpendicular to the sheet surface of FIG. 1), and a lens 8 for focusing the reflection from the lamp 7 onto the film 5 in the original scale. The scanner 6 is movable in the subscanning direction as indicated by an arrow in FIG. 1. Therefore, the scanner unit 1 may have the same construction as the scanner of a conventional analog copier, except for the film 5 and power source 2. The illumination unit 9 has a lamp 11 for illuminating the film 5; light transmitted through the film 5 is radiated upward via the glass platen 3. A Fresnel lens 10 is also included in the unit 9 and held in contact with the underside of the film 5. The projection unit 12 has an even number of mirrors 13 and 14 and a lens 15 for enlargement. The projection unit 12 is supported by supporting means, not shown, as a single unit. Hence, the illumination unit 9 and projection unit 12 can be implemented by optics similar to the optics of a conventional purely optical OHP.

Figure 3A:
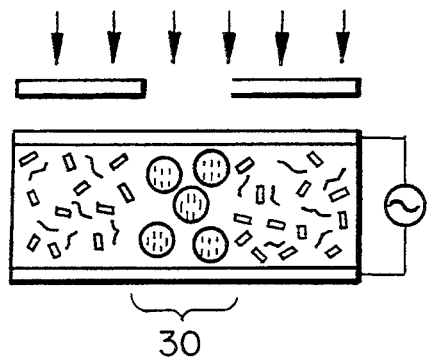
FIGS. 3A–3C schematically show the principle of operation of a combined polymer and liquid crystal film included in the embodiment.
Figure 3B:
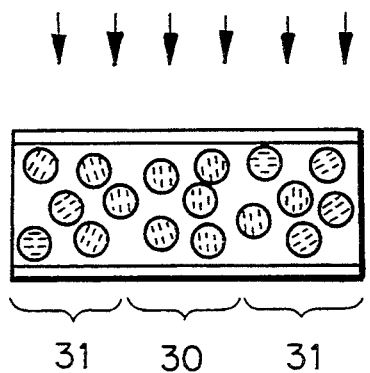
Figure 3C:
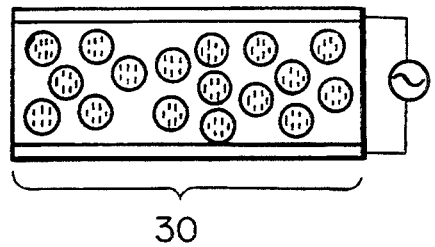

A reference will be made to FIGS. 3A-3C for describing the principle of operation of the composite film 5. In these figures, the reference numerals 30 and 31 designate a transparent portion and a diffusing portion, respectively. To begin with, in the film 5, a substance produced by photopolymerization selectively transmits or diffuses light, depending on whether or not an electric field is present. Regarding a photopolymerization composition, there are known, for example, cyanobiphenyl liquid crystals and bifunctional urethanacrylate oligomers (molecular weight of 2000) and monomers (2-hydroxyethyl acrylate). The film 5 is set beforehand such that the refractive index of the matrix and that of liquid crystals to ordinary light coincide. Then, as shown in FIG. 3A, when the film 5 is illuminated while being applied with an electric field, the crystals undergo phase separation in the illuminated portion with the result that polymerization proceeds there. As a result, the entire phase becomes transparent and remains transparent even when the electric field disappears, since the orientation is fixed. On the other hand, when the composition is simply subjected to photopolymerization, the refractive index becomes spatially irregular since the orientation of the crystal phase is random. As a result, as shown in FIG. 3B, the film 5 diffuses incident light and becomes opaque. Further, when a voltage is applied to the film 5, the crystals are aligned in the direction of the electric field with the result that the liquid crystal portion and the matrix portion coincide in refractive index. Consequently, the film 5 becomes transparent, as shown in FIG. 3C. In this way, although the transmittance of the :film 5 noticeably changes depending on the ON/OFF of the electric field, a document image can be optically transferred without resorting to photoelectric conversion.

The operation of the embodiment is as follows. To read the document 4 optically and transfer it to the film 5, the document 4 is laid on the glass platen 3, as shown in FIG. 1. At the same time, a voltage is applied from the power source 2 to the transparent electrodes 5a and 5b formed on the upper and lower surfaces of the film 5.

In this condition, the scanner 6 scans the document 4 while the resulting reflection from the document 4 scans the film 5. As a result, an image matching the document image in tonality is transferred to the film 5 in the form of a tansmittance distribution and in the original scale of the document image. Then, the power source 2 is turned off to stop applying the voltage to the transparent electrodes 5a and 5b. Consequently, the image formed in the film 5 is preserved. It is to be noted that the image transferred to the film 5 is a negative of the document image.

Subsequently, as shown in FIG. 2, the document 4 is removed from the glass platen 3, and then the lamp 11 of the illumination unit 9 is turned on. At this instant, the scanner 6 has been retracted from between the glass platen 3 and the film 5. As a result, the image held in the film 5 is projected as an enlarged positive onto a screen, not shown, by the mirrors 13 and 14 and lens 15 of the projection unit 12.

As stated above, the embodiment optically transfers the image of the document 4 to the film 5 and then projects it in an enlarged scale. Hence, it is possible to project the plain paper document 4 without resorting to a scanner or a digital image processing circuit which is indispensable for a projector of the type using a TFT type liquid crystal display for reading a document by photoelectric conversion.

Figure 4:
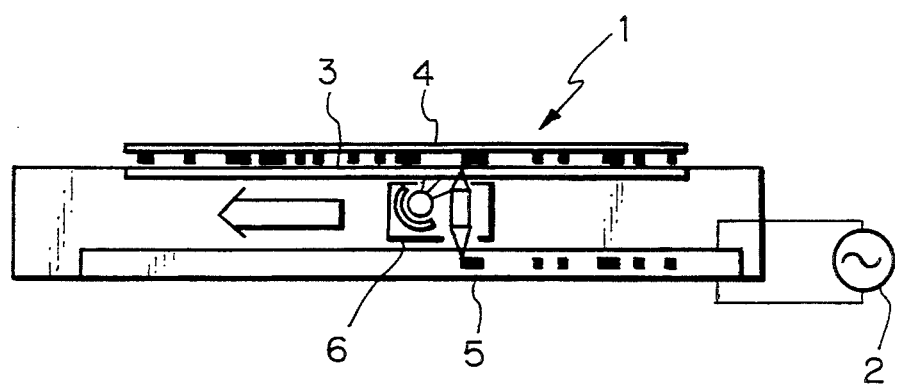
FIG. 4 demonstrates an document reading operation available with a scanner unit included in the embodiment when it is used alone.
Figure 5:
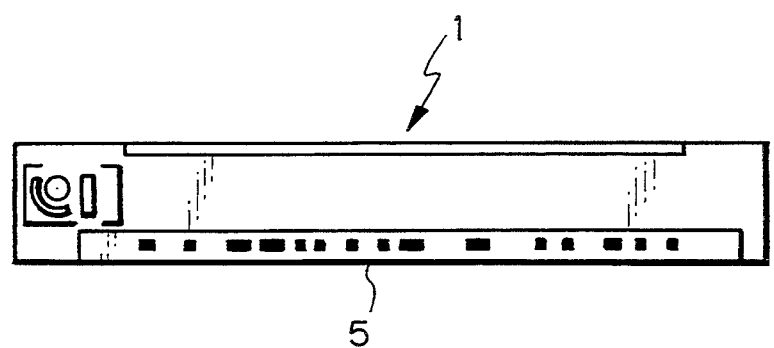
FIG. 5 is a view similar to FIG. 4, showing the scanner unit completed the reading operation.
Figure 6:
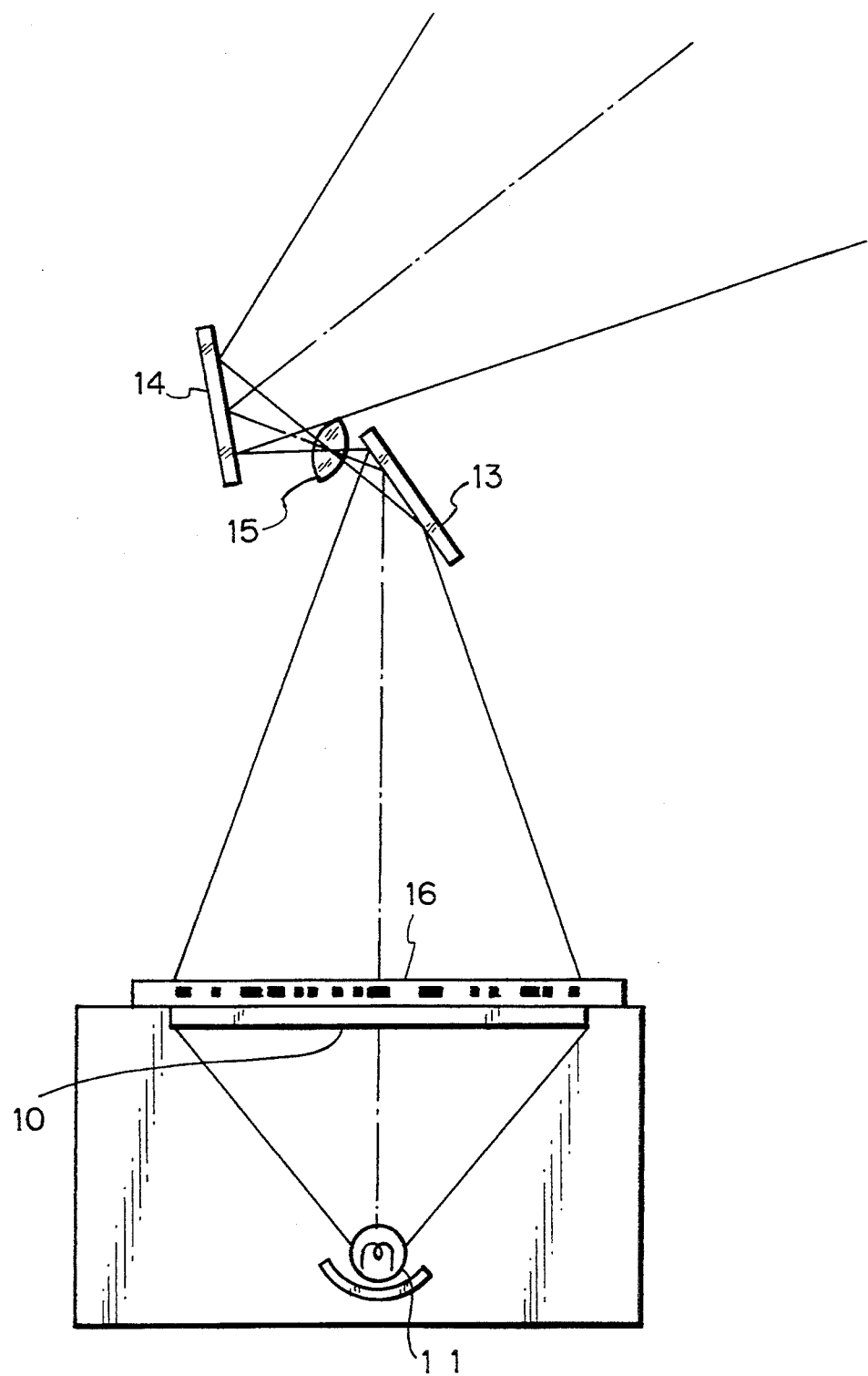
FIG. 6 is a sectional side elevation showing how the embodiment projects an OHP sheet.

The scanner unit 1 is removable from the illumination unit 9 and, therefore, may be removed :from the unit 9 so as to read a document in a different place, as shown in FIGS. 4 and 5. Further, the scanner unit 1 may be mounted on an existing purely optical OHP. In addition, since the two units 9 and 12 are usable as a purely optical OHP, even an OHP sheet 16 can be projected if the unit 1 is removed from the unit 9. In this way, the embodiment is usable as an unprecedented convenient OHP.

Figure 7A:
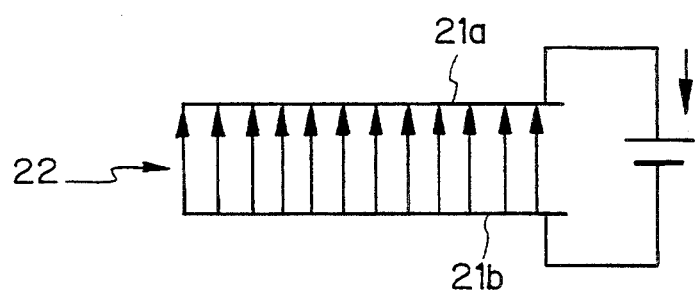
FIGS. 7A–7C schematically show the principle of operation of another optically responsive liquid crystal film.
Figure 7B:
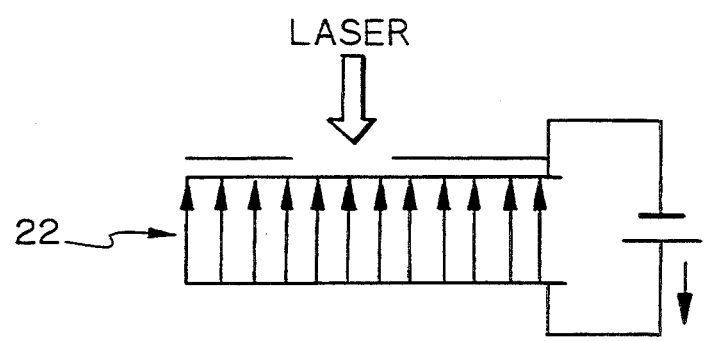
Figure 7C:
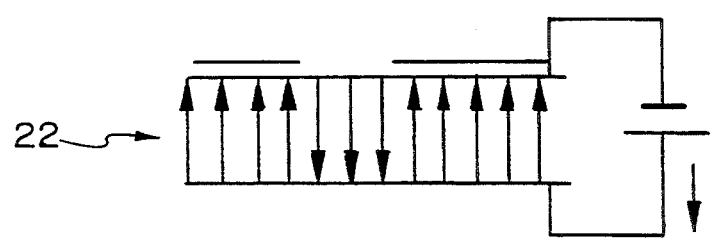

The film 5, which is a specific form of an optically responsive liquid crystal film, may be replaced with ferroelectric liquid crystals (FLC) with which, for example, an azobenzene derivative is mixed. Reported in "NATURE VOL 361 4 FEBRUARY 1993", this kind of liquid crystals are confined in a 2 microns gap formed by indium oxide (ITO) films which are transparent conductive films. Referring to FIGS. 7A and 7C, the principle of operation of this kind of liquid crystals will be described. First, as shown in FIG. 7A, a voltage of several volts is applied to between two ITO films 21a and 21b. Then, as shown in FIG. 7B, the polarity of voltage is inverted while an image is projected (or a laser beam is emitted) onto liquid crystals 22. As a result, as shown in FIG. 7C, the phase of the liquid crystals 22 changes depending on the incident light, thereby forming an image therein. This image is held in the liquid crystals 22 so long as the polarity of the voltage is not inverted.

2nd Embodiment

Figure 8:
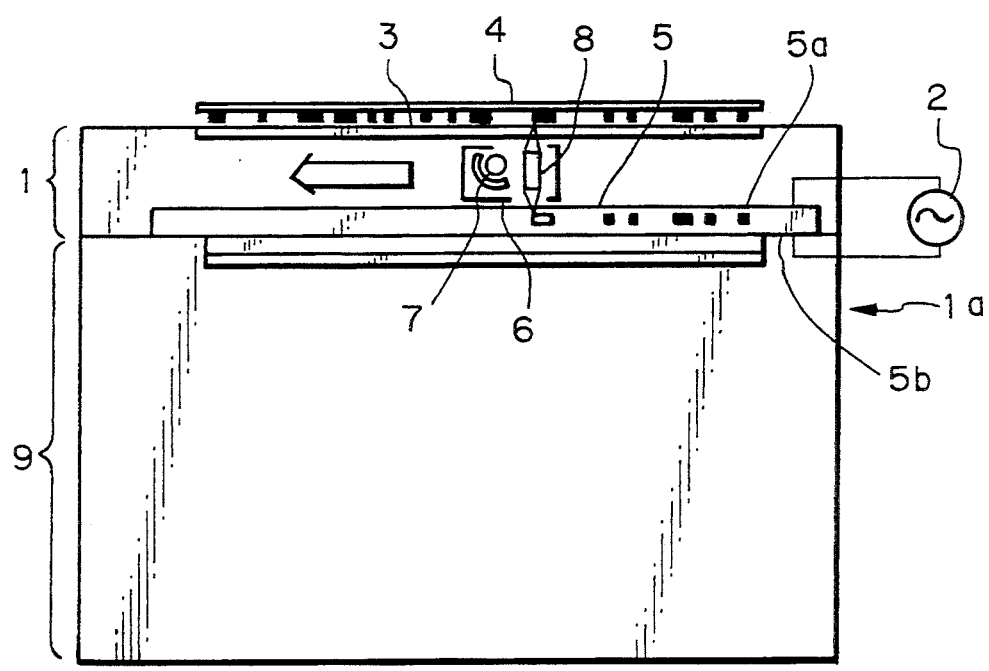
FIG. 8 is a side elevation showing a second embodiment of the present invention in a document reading condition.
Figure 9:
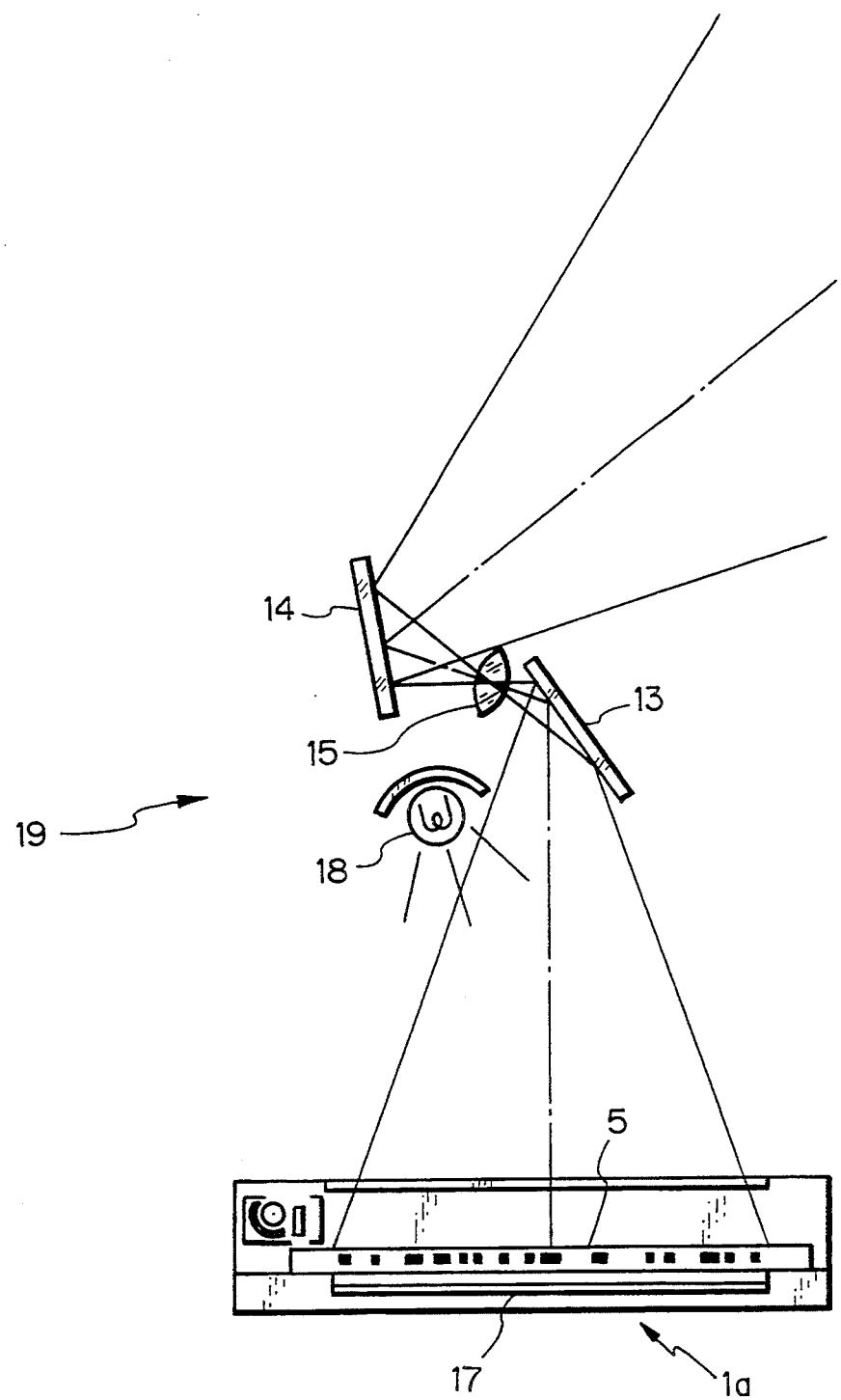
FIG. 9 is a view similar to FIG. 8, showing the second embodiment in an image projecting condition.

FIGS. 8 and 9 show an alternative embodiment of the present invention. As shown, this embodiment projects an image by reflection as distinguished from transmission. Specifically, the embodiment has a scanner unit 1a generally made up of the scanner unit 1 of the previous embodiment and a Fresnel lens mirror 17. More specifically, the embodiment has the combined polymer and liquid crystal film 5 for selectively transmitting or diffusing incident light, transparent electrodes 5a and 5b provided on the film 5, light source 2 for applying a voltage to the electrodes 5a and 5b, transparent glass platen 3 to be loaded with the document 4, scanner 6 for optically scanning the document 4 and transferring it to the film 5, and Fresnel lens mirror 17 contacting the underside of the film 5.

An illumination and projection unit 19 has a lamp 18 for illuminating the upper surface of the film 5 from above via the glass platen 3, in addition to the even number of mirrors 13 and 14 for sequentially reflecting light condensed and reflected by the Fresnel lens mirror 17 via the film 5, and lens 15 for enlargement. This unit 19 is fixed in place relative to the Fresnel lens mirror 17 of the scanner unit 1a.

In operation, as shown in FIG. 8, the document 4 is laid on the glass platen 3, and then a voltage is applied from the power source 2 to the transparent electrodes 5a and 5b, as in the previous embodiment. As the scanner 6 scans the document 4, the resulting reflection from the document 4 scans the film 5. As a result, an image matching the document image in tonality is formed in the film 5 in the form of a transmittance distribution and in the original scale. When the power source 2 is turned off to stop applying the voltage to the electrodes 5a and 5b, the image formed in, or transferred to, the film 5 is preserved.

Subsequently, as shown in FIG. 9, the document 4 is removed from the glass platen 3, the lamp 11 of the illumination and projection unit 19 is turned on, and the scanner 6 is retracted from between the glass platen 3 and the film 5. In this condition, the image formed in the film 5 is projected onto a screen, not shown, by the mirrors 13 and 14 and lens 15 as an enlarged positive image.

3rd Embodiment

Figure 10:
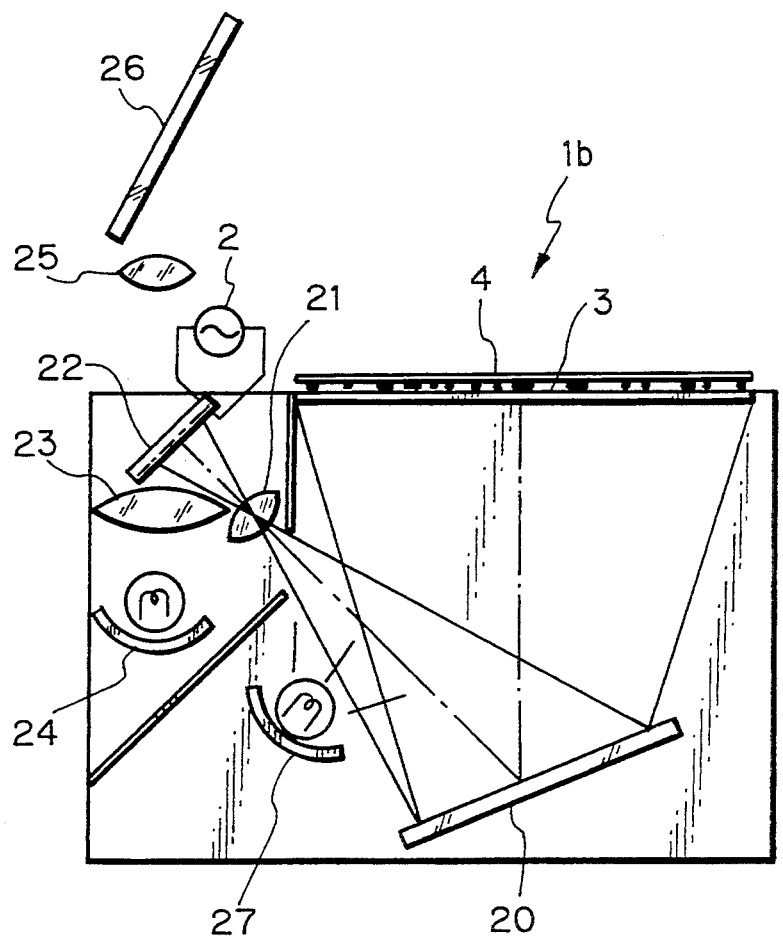
FIG. 10 is a sectional side elevation showing a third embodiment of the present invention in a document reading condition.
Figure 11:
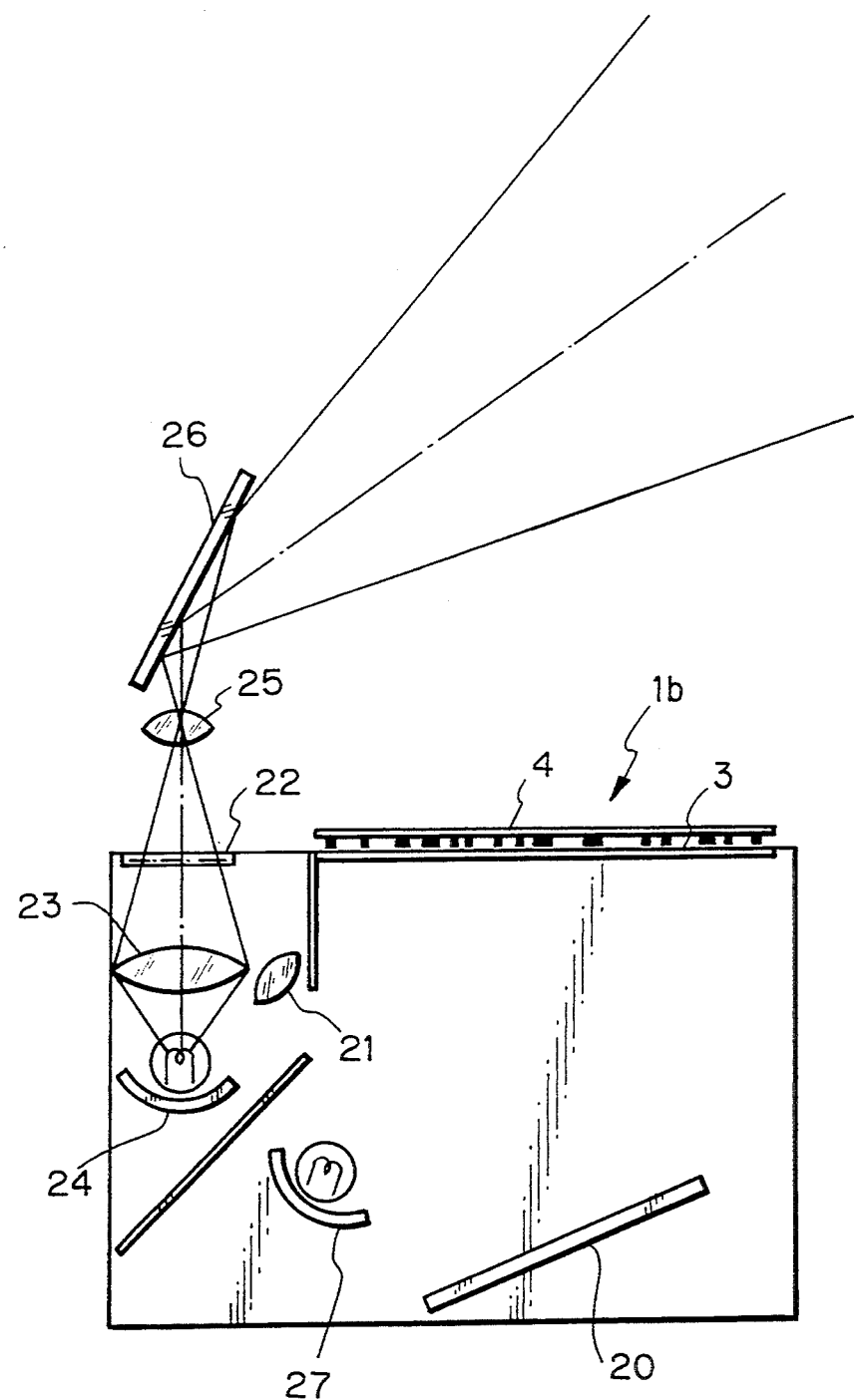
FIG. 11 is a sectional side elevation similar to FIG. 10, showing the third embodiment in an image projecting condition.

Another alternative embodiment of the present invention will be described with reference to FIGS. 10 and 11. This embodiment reads a document in a reduced scale, by contrast to the first and second embodiments. As shown, the embodiment has a combined polymer and liquid crystal film 22 which is rotatable about one end thereof. The film 2 2 selectively moves to an optical path for reading the document 4, as shown in FIG. 10, or to an optical path for projection, as shown in FIG. 11. Such a movement of the film 22 may be effected either electrically or manually, as desired. A scanner unit 1b has a lamp 27, a mirror 20, lenses 21 and 23, a lamp 24, a lens 25, and a mirror 26 which are fixed in respective positions. The lamp illuminates the document 4 via the glass platen 3 while the mirror 20 and lens 21 steer the resulting reflection from the document 4 to the film 22 to form a reduced image. The lamp, mirror 20 and lens 21, therefore, constitute reading optics in combination. The lamp 24 and lens 23 illuminate the film 22 while the lens 25 and mirror 26 project light transmitted through the film 22 onto a screen, not shown, in an enlarged scale. In this sense, the lamp 24, lenses 23 and 25 and mirror 26 constitute projecting optics. The lens and mirror 26 are affixed to the scanner unit 1b by a support member, not shown. The number of mirrors 26 is odd since a positive of the document image is written to the film 22 by the mirror 20 and since the light transmitted through the film 22 is projected onto the screen.

As stated above, this embodiment writes a document image in the film 22 in a reduced scale and, therefore, successfully reduces the required size of the film 22. As a result, this embodiment is practicable with lower cost than the first and second embodiments.

In summary, it will be seen that the present invention has various unprecedented advantages, as enumerated below.

(1) A document image is transferred to an optically responsive film purely optically, i.e., without being subjected to photoelectric conversion. This eliminates the need for a special transparent document and, in addition, allows a document image to be projected by use of the optically responsive film.

(2) The present invention is practicable not only with opaque plain papers but also with OHP sheets.

(3) Since a document image is focused onto the film in a reduced scale, the film can be sized smaller than a document.

(4) The present invention can be selectively mounted to or dismounted from an ordinary purely optical image projector. Hence, not only plain papers but also transparent OHP sheets can be projected by simple operation.

(5) Since the film is implemented as an optically responsive liquid crystal film, plain papers can be projected without resorting to an electrically driven TFT type liquid crystal display.

(6) The present invention implements a small size, inexpensive and easy-to-operate image projector.

Various modifications will become possible for those skilled in the art after receiving the teachings of the present disclosure without departing from the scope thereof.

What is claimed is:

1. An image projector, comprising:
    a transparent support;
    an optically responsive film disposed below said transparent support;
    a scanner, disposed between said transparent support and said optically response film, which scans an image of an object on said transparent support to said optically responsive film;
    a light projector disposed under said optically response film; and
    an optically assembly, disposed above said transparent support, which directs and focuses light projecting out of said transparent support which has passed through said optically responsive film and originated from said light projector.

2. An image projector according to claim 1, wherein:
    said scanner is a movable scanner including a light source and a lens, said scanner moving below said transparent support during a scanning of said object on said transparent support and illuminating said object using said light source and focusing light from said light source reflected off of said mirror through said lens onto said optically responsive film.

3. An image projector according to claim 1, wherein:
    said optically responsive film comprises a photosensitive liquid crystal polymer.

4. An image projector according to claim 3, wherein:
    said optically responsive film comprises ferroelectric liquid crystals.

5. An image projector according to claim 3, further comprising:
    a Fresnel lens disposed between said optically responsive film and said light projector.

6. An image projecting method, comprising the steps of:

placing an object onto a transparent support;

illuminating said object from a light source below said transparent support, reflecting light from said light source off of said object and forming an image on an optically responsive film;

recording the image formed on said optically responsive film onto said optically responsive film;

removing said object from said transparent support;

projecting light from below said optically responsive film, through said optically responsive film and onto a surface for receiving said projected image.

7. An image projecting method according to claim 6, wherein said step of illuminating, reflecting and forming uses a movable scanner which moves along an underside of said transparent support and scans an image of said object onto said optically responsive film.

8. An image projecting method according to claim 6, wherein said projecting step includes the steps of reflecting and focusing light which has passed through said optically responsive film onto the surface for receiving said projected image.

* * * * *